April 18, 1961   C. G. LIFKA   2,980,450
CONNECTOR FITTINGS FOR SMALL SIZE FLEXIBLE CONDUIT
Filed July 6, 1959
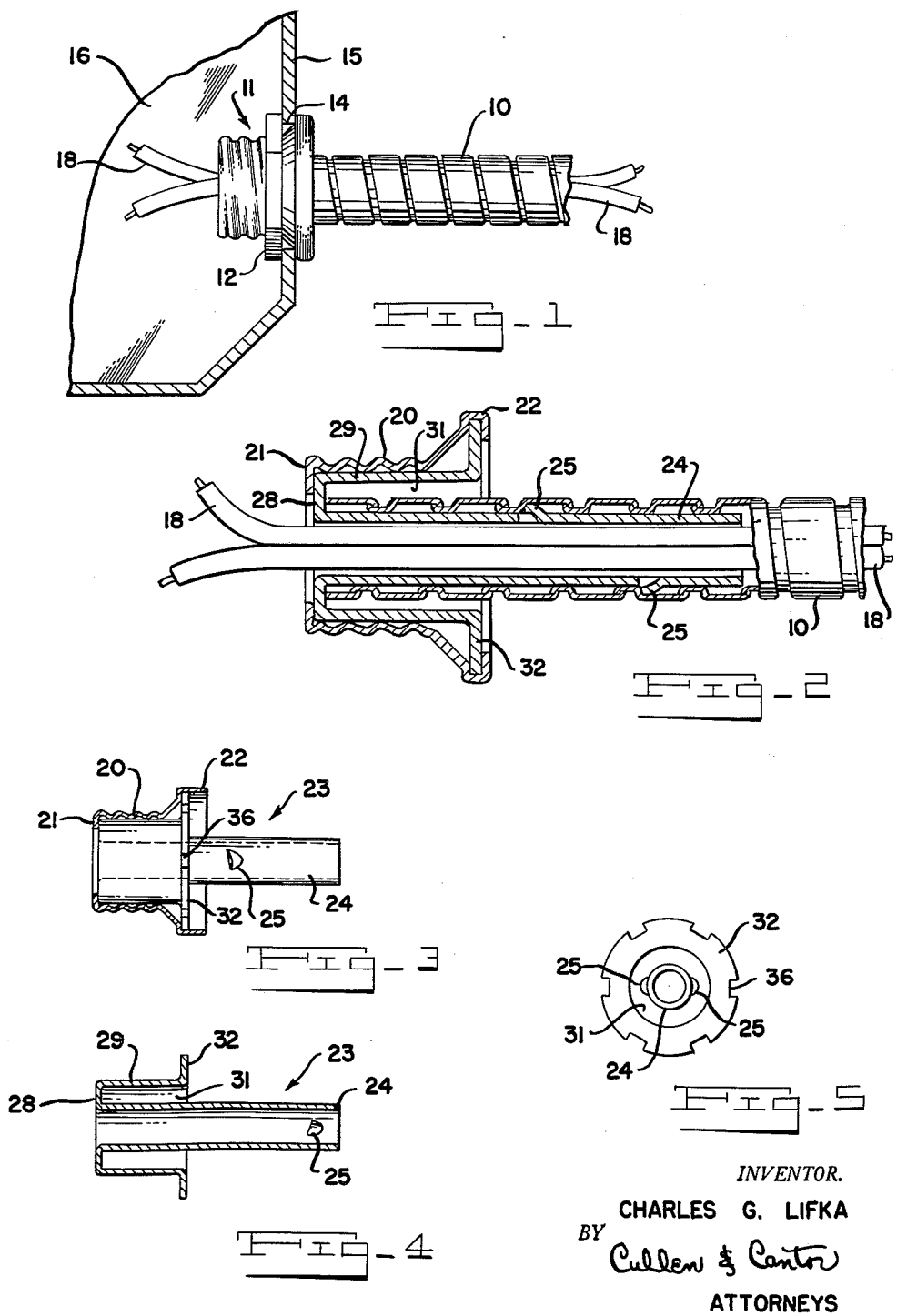
INVENTOR.
CHARLES G. LIFKA
BY
Cullen & Cantor
ATTORNEYS

United States Patent Office 2,980,450
Patented Apr. 18, 1961

2,980,450
CONNECTOR FITTINGS FOR SMALL SIZE FLEXIBLE CONDUIT

Charles G. Lifka, 20000 Sherwood Ave., Detroit, Mich.

Filed July 6, 1959, Ser. No. 825,156

1 Claim. (Cl. 285—161)

This application relates to connector fittings for flexible conduit of small size and particularly for flexible conduit of the type known to the trade as "⅜-Greenfield" and characterized by the fact that the outer diameter of the conduit (⁹⁄₁₆″) is considerably smaller than the ⅞″ hole in the connector box to which the conduit is to be fastened, with the conduit itself comprising a ridged strip helically wound to provide a helical groove in the interior of the conduit whose turns are separated by the helical ridge.

A fitting for such conduit but of a larger size is shown in my prior Patent 2,784,010 of March 5, 1957. In that patent, the conduit is shown of the size approximating the size of the ferrule of the fitting and thus of the size of the hole in the connector box to which the conduit is connected. The conduit there shown, however, is of "Greenfield" form. In this application I disclose a fitting for the same type of conduit but of a smaller size.

An object of the present invention is to provide a sheet metal connector fitting for such conduit made inexpensively of two separate members, namely, a ferrule and a sleeve member.

A more specific object of the present invention is to form such fitting of extremely sturdy construction. Strength of fitting is a special problem in a fitting of the type under consideration, made of sheet metal, and where the fitting is to be used on conduit of a smaller size than the connector hole, i.e., where the ferrule is considerably larger in diameter than the conduit received within the fitting.

A still further object is to provide a fitting of this character which is so constructed that the conduit or armor has its end directly against the forward wall of the fitting or ferrule and since this forward wall is inside the box, likewise the end of the conduit is also inside the connector box.

Further advantages of the present fitting will best be understood upon reference to the appended drawing and to the specification which follows:

In this drawing:

Fig. 1 shows the fitting in use for fastening a conduit to a connector box.

Fig. 2 shows the parts in section.

Fig. 3 is a view showing the two parts of the fitting positioned in relative assembly but with the assembly not yet completed.

Fig. 4 shows the sleeve member of the fitting, per se.

Fig. 5 is a view as if from the right of Fig. 4.

Referring to the drawing, it will be observed that Fig. 1 shows a length of small size "Greenfield" 10 having on its end a fitting 11 which, with the cooperation of a lock nut 12, secures the conduit in a hole 14 of a wall 15 of a connector box 16. Wires 18 are shown as extended through conduit 10 and into box 16.

Fitting 11 comprises a ferrule 20 formed of sheet metal with rolled external threads and having its forward edge inwardly flanged at 21 and its rear edge outwardly bulged at 22. Within the ferrule is a sleeve member 23 having an extended tubular portion 24 fitted within conduit 10.

Tubular portion 24 is of a size to fit inside the conduit and has integrally formed outwardly projecting lugs 25 for interlocking with the conduit spiral inner ridges and thus for interlocking sleeve 23 to conduit 10. Lugs 25 here shown are the type shown at 24—26 in my prior Patent 2,784,010 and used for the same purpose.

Sleeve 23 has its forward edge flanged outwardly to provide a forward wall 28 and turned rearwardly to provide an outer tubular member 29 spaced from tubular portion 24 a distance greater than the thickness of conduit 10 to enable that conduit to be received in the annular space 31 between tubular portion 24 and outer tubular member 29 with the end of conduit 10 abutting forward wall or flange 28 of the sleeve.

The rear edge of member 29 is flanged outwardly as at 32 and at 36.

Sleeve wall 28 in the completed fitting is behind, but is against forward wall flange 21 of ferrule 20. Outer tubular member 29 is inside and against ferrule 20. Inner tubular portion 24 extends well beyond rear edge 22 of the ferrule which, for the purposes of locking the ferrule and the sleeve in assembly, is spun over sleeve flange 32 as shown to interlock ferrule 20 and sleeve member 23 together.

Tubular member 29 of sleeve 23 reinforces ferrule 20 by providing a double wall, double ring connection between the front and rear parts of the fitting. Likewise, forward wall 28 and walls 24—29 of member 23 reinforce the inner edge of front wall 21 of ferrule 20.

Inner edge of flange 21 of ferrule 20 is shielded from wires 18 within conduit 10 and within sleeve 24 and thus such edge can not scrape the wires.

Since the end of the armor or conduit goes directly up to forward wall 28 of the fitting, which wall is inside the connector box when the parts are in assembly and held in the box by the lock nut, it becomes impossible at any time for the wires to be exposed at the fitting. Contrast this with the situation where a conduit terminates outside the box; if the conduit is bent at a sharp angle to the box and is pulled hard enough to bend the sleeve 24, the box wall would not help resist the bending of the conduit and when the bending did take place, the wires would be exposed at the outside of the bend. Using the fitting hereof, it will be observed that the wall of the box plus the conduit itself resists the bending of the end of the conduit and resists the bending of the sleeve 24 and thus at no time is it possible for wires inside the conduit to be exposed by any strain on the conduit.

It is also observed that the fitting hereof is so constructed as to include no screws or screw clamps or split ring clamps outside the box, commonly found in old-fashioned fittings.

It is understood that sturdiness of the fitting is a primary requirement for a satisfactory fitting and sturdiness is very satisfactorily provided by the fitting hereof. The problem of sturdiness is particularly aggravated when a small armor is mounted in a large ferrule of a fitting used in a larger size hole in a connector box. The fitting of this application is extremely sturdy and satisfactory despite that it secures a small size conduit to a considerably larger hole in a box.

Now having described the fitting hereof, reference should be had to the claim which follows.

I claim:

A connector for securing a spirally formed, flexible, ridged conduit to a box through a hole in the box and wherein the outer dimension of the conduit is considerably less than the hole, said connector comprising a ferrule and a sleeve; the ferrule being in the form of a thin-wall sheet metal tube having a forward end formed with a continuous, integral, radially inwardly directed flange, and having external threads formed thereon by deforming the wall so that the threads are internal threads, as well as external threads, the internal threads defining the inner surface of the wall, the threads extending from the forward end part way to the rear end, and with the outer diameter of the ferrule at its threads being approximately equal to the diameter of a box hole through which it may be inserted and with its rear end, beginning at the threads, being outwardly flared a distance greater than the diameter of the box hole so as to abut the box at the edge defining the hole and hence act as a stop when the ferrule threads are inserted through the hole; the sleeve being formed of a single piece of thin sheet metal bent into an inner tube of a diameter slightly less than the diameter of the conduit for snugly fitting within the conduit and an outer tube surrounding and spaced from and coaxial with the inner tube, the tubes being integrally joined together by an annular flat wall portion integral with both of the tubes forward ends, the inner tube being considerably longer than the ferrule and the outer tube being approximately the length of the ferrule, said sleeve being fitted into the ferrule with its forward wall portion in face to face contact with the ferrule flange and with the outer tube being in face to face contact with the inner wall, that is, the inner portion of the internal threads of the ferrule; the rear end of said outer tube being bent into a radially outwardly directed flange fitted into and surrounded by the flared rear end of the ferrule, and the rear end of the ferrule being bent over the outer tube flange and being arranged in overlying contact with the outer peripheral portion of the rear face of the outer tube flange and tightly gripping the outer tube flange to rigidly secure the sleeve to the ferrule; and means formed on the outer surface of the inner tube for mechanically interlocking the sleeve to the conduit, with the space between the inner and outer tubes being of a size to receive the forward end of the conduit so that the forward end of the conduit may receive the inner tube and be positioned within the outer tube and thus within the ferrule.

References Cited in the file of this patent
UNITED STATES PATENTS

| | | |
|---|---|---|
| 120,508 | Fletcher | Oct. 31, 1871 |
| 2,784,010 | Lifka | Mar. 5, 1957 |
| 2,932,532 | Lifka | Apr. 12, 1960 |